United States Patent [19]

Maeda et al.

[11] Patent Number: 5,157,735
[45] Date of Patent: Oct. 20, 1992

[54] CHIPPING DETECTION SYSTEM AND METHOD

[75] Inventors: Shunji Maeda, Yokohama; Hitoshi Kubota, Fujisawa; Satoru Fushimi; Takashi Hiroi, both of Yokohama, all of Japan

[73] Assignee: Hitachi, Ltd., Tokyo, Japan

[21] Appl. No.: 393,936

[22] Filed: Aug. 15, 1989

[30] Foreign Application Priority Data

Sep. 9, 1988 [JP] Japan .................................. 63-224443
Oct. 7, 1988 [JP] Japan .................................. 63-251757

[51] Int. Cl.⁵ .............................................. G06K 9/00
[52] U.S. Cl. .......................................... 382/8; 382/22; 382/21; 358/107; 358/106
[58] Field of Search ................... 382/22, 33, 34, 8, 30, 382/48; 358/106, 107; 364/474.29, 507

[56] References Cited

U.S. PATENT DOCUMENTS

| | | | |
|---|---|---|---|
| 4,156,231 | 5/1979 | Edamatsu et al. | 382/28 |
| 4,496,971 | 1/1985 | West et al. | 382/8 |
| 4,524,454 | 6/1985 | Ejiri | 382/21 |
| 4,845,763 | 7/1989 | Bandyopadhyay | 358/106 |

FOREIGN PATENT DOCUMENTS 56-48544 5/1981 Japan .
61-255484 11/1986 Japan .

OTHER PUBLICATIONS

Journal of Optical Society of America, vol. 2, No. 11, Nov. 1985, "Automated Digital Visual Inspection with Dark-Field Microscopy", J. L. C. Sans et al, pp. 1857–1862.

8th International Conference on Pattern Recognition, "An Experimental System for Disk Head Inspection", D. Petkovic et al, pp. 9–13.

IEEE Transactions on Pattern Analysis and Machine Intelligence, vol. PAMI-9, No. 2, Mar. 1987, "A Rule-Based System for Verifying Engineering Specifications in Industrial Visual Inspection Applications", D. Petkovic, pp. 306–311.

Primary Examiner—David K. Moore
Assistant Examiner—Yon Jung
Attorney, Agent, or Firm—Fay, Sharpe, Beall, Fagan, Minnich & McKee

[57] ABSTRACT

A system and a method of detecting a chipping of the rail part of a slider of a thin film magnetic head obtains the image of the object of detection and its boundary coordinates by tracing the boundary of the object of detection from the image. A chipping size is obtained from the coordinates of the points on the boundary, and the presence or absence of chipping is judged from the chipping size, thereby enabling the highly precise detection of a chipping defect generated on the boundary portion of the object of detection using a simple structure.

18 Claims, 18 Drawing Sheets

FIG. 3
BOUNDARY COORDINATE TABLE
| BOUNDARY COORDINATE NO. | x COORDINATE | y COORDINATE |
|---|---|---|
| 1 | $x_1$ | $y_1$ |
| 2 | $x_2$ | $y_2$ |
| ⋮ | ⋮ | ⋮ |
| $P-\ell_1$ | $x_{P-\ell_1}$ | $y_{P-\ell_1}$ |
| ⋮ | ⋮ | ⋮ |
| $P$ | $x_P$ | $y_P$ |
| ⋮ | ⋮ | ⋮ |
| $P+\ell_2$ | $x_{P+\ell_2}$ | $y_{P+\ell_2}$ |
| ⋮ | ⋮ | ⋮ |
} READING OUT OF $2k+1$ COORDINATE VALUES
⇓
DETECTION OF $2k-1$ CHIPPING WIDTHS $D_{\ell_1,\ell_2}$
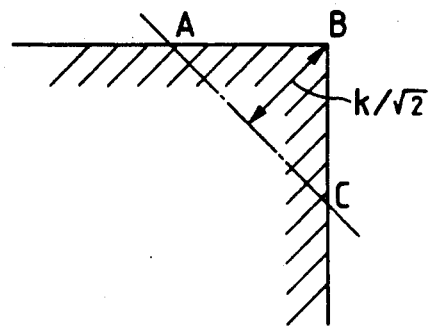
FIG. 4(a)
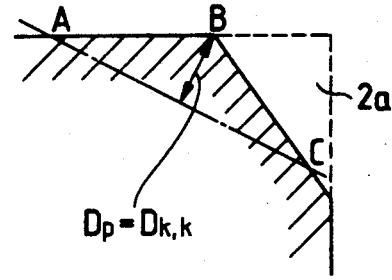
FIG. 4(b)

FIG. 8

PATTERN NO. ⓪   ①   ②   ③

PATTERN NO. ④   ⑤   ⑥   ⑦

※BLANK BOXES INDICATE DON'T CARE

FIG. 9

| TRACING DIRECTION | → | ↗ | ↑ | ↖ | ← | ↙ | ↓ | ↘ |
|---|---|---|---|---|---|---|---|---|
| PATTERN NO. | ⓪ | ① | ② | ③ | ④ | ⑤ | ⑥ | ⑦ |
| x UP/DOWN | +1 | +1 | 0 | −1 | −1 | −1 | 0 | +1 |
| y UP/DOWN | 0 | −1 | −1 | −1 | 0 | +1 | +1 | +1 |

| DIRECTION CODE OF PREVIOUS BOUNDARY PIXELS | PRIORITY OF DIRECTION CODE OF THE NEXT PIXEL (HIGH) → (LOW) | | | | | | | |
|---|---|---|---|---|---|---|---|---|
| ⓪ | 5 | 6 | 7 | 0 | 1 | 2 | 3 | 4 |
| ① | 6 | 7 | 0 | 1 | 2 | 3 | 4 | 5 |
| ② | 7 | 0 | 1 | 2 | 3 | 4 | 5 | 6 |
| ③ | 0 | 1 | 2 | 3 | 4 | 5 | 6 | 7 |
| ④ | 1 | 2 | 3 | 4 | 5 | 6 | 7 | 0 |
| ⑤ | 2 | 3 | 4 | 5 | 6 | 7 | 0 | 1 |
| ⑥ | 3 | 4 | 5 | 6 | 7 | 0 | 1 | 2 |
| ⑦ | 4 | 5 | 6 | 7 | 0 | 1 | 2 | 3 |

|  | -5 | -4 | -3 | -2 | -1 | 0 | 1 | 2 | 3 | 4 | 5 |
|---|---|---|---|---|---|---|---|---|---|---|---|
| -5 | 45 | 51 | 59 | 68 | 79 | 0 | -79 | -68 | -59 | -51 | -45 |
| -4 | 39 | 45 | 53 | 63 | 76 | 0 | -76 | -63 | -53 | -45 | -39 |
| -3 | 31 | 37 | 45 | 56 | 72 | 0 | -72 | -56 | -45 | -37 | -31 |
| -2 | 22 | 27 | 34 | 45 | 63 | 0 | -63 | -45 | -34 | -27 | -22 |
| -1 | 11 | 14 | 18 | 27 | 45 | 0 | -45 | -27 | -18 | -14 | -11 |
| 0 | 0 | 0 | 0 | 0 | 0 | 0 | 0 | 0 | 0 | 0 | 0 |
| 1 | -11 | -14 | -18 | -27 | -45 | 0 | 45 | 27 | 18 | 14 | 11 |
| 2 | -22 | -27 | -34 | -45 | -63 | 0 | 63 | 45 | 34 | 27 | 22 |
| 3 | -31 | -37 | -45 | -56 | -72 | 0 | 72 | 56 | 45 | 37 | 31 |
| 4 | -39 | -45 | -53 | -63 | -76 | 0 | 76 | 63 | 53 | 45 | 39 |
| 5 | -45 | -51 | -59 | -68 | -79 | 0 | 79 | 68 | 59 | 51 | 45 |

$y_P - y_{P+l_2}$ (k=5)

$$\tan^{-1}\left(\frac{y_P - y_{P+l_2}}{x_P - x_{P+l_2}}\right) \text{ (DEGREE)}$$

| BOUNDARY COORDINATE NO. | x | y |
|---|---|---|
| 1 (STARTING POINT) | | |
| 2 | | |
| 3 | | |
| 4 | | |
| 5 | | |
| ⋮ | ⋮ | ⋮ |
| P−k | $x_a$ | $y_a$ |
| ⋮ | ⋮ | ⋮ |
| P | $x_b$ | $y_b$ |
| ⋮ | ⋮ | ⋮ |
| P+k | $x_c$ | $y_c$ |
| ⋮ | ⋮ | |
| L (BOUNDARY LENGTH) | | |

→ CURVATURE θ
→ (CHIPPING WIDTH D)

FIG. 20

| $y_b - y_a$ \ $x_b - x_a$ | -5 | -4 | -3 | -2 | -1 | 0 | 1 | 2 | 3 | 4 | 5 |
|---|---|---|---|---|---|---|---|---|---|---|---|
| -5 | 45 | 51 | 59 | 68 | 79 | 0 | -79 | -68 | -59 | -51 | -45 |
| -4 | 39 | 45 | 53 | 63 | 76 | 0 | -76 | -63 | -53 | -45 | -39 |
| -3 | 31 | 37 | 45 | 56 | 72 | 0 | -72 | -56 | -45 | -37 | -31 |
| -2 | 22 | 27 | 34 | 45 | 63 | 0 | -63 | -45 | -34 | -27 | -22 |
| -1 | 11 | 14 | 18 | 27 | 45 | 0 | -45 | -27 | -18 | -14 | -11 |
| 0 | 0 | 0 | 0 | 0 | 0 | 0 | 0 | 0 | 0 | 0 | 0 |
| 1 | -11 | -14 | -18 | -27 | -45 | 0 | 45 | 27 | 18 | 14 | 11 |
| 2 | -22 | -27 | -34 | -45 | -63 | 0 | 63 | 45 | 34 | 27 | 22 |
| 3 | -31 | -37 | -45 | -56 | -72 | 0 | 72 | 56 | 45 | 37 | 31 |
| 4 | -39 | -45 | -53 | -63 | -76 | 0 | 76 | 63 | 53 | 45 | 39 |
| 5 | -45 | -51 | -59 | -68 | -79 | 0 | 79 | 68 | 59 | 51 | 45 |

CHIPPING DETECTION SYSTEM AND METHOD

BACKGROUND OF THE INVENTION

1. Field of the Invention

The present invention relates to a system and a method of detecting chipping produced on the boundary of an object of detection and, more particularly, to a chipping detection system and method suitable for detecting chipping in the visual inspection of a slider of a thin film magnetic head portion of a disk driver.

2. Description of the Related Art

In a slider of a thin film magnetic head, the rail part comes into contact with a disk. For this reason, if there is chipping, there is a fear of damaging the disk, so that very strict quality control must be carried out.

The chipping detection is conventionally carried out with human eyes, but in place of such detection various techniques for automatically detecting chipping has been proposed. Some of the conventional techniques relating to this kind of system are disclosed, for example, in Japanese Patent Laid-Open No. 255484/1986 and Japanese Patent Publication No. 13617/1987. In the former method, a straight line is applied by a least square method to the boundary of the straight line portion of a binary image obtained by the detection through a TV camera or the like and the values of the binary image are examined along the straight line. From the results, the presence or absence of a chipping is judged. In the latter method, scattered light produced by chipping is detected, and for this purpose, the incident angle and the disposition of a scattered light receptor are optimized.

These two conventional techniques respectively have the following problems.

In the former technique, since approximation using a least square method is necessary, calculation requires a long time or the scale of hardware is enlarged, thereby making it impossible to obtain a high-speed and small-scale system. In addition, since a chipping at the corner portion of an object of detection is not taken into consideration, it is impossible to detect a chipping at a corner portion.

In the latter technique, since the positional relationship between the scattered light receptor and an object of detection is fixed, it is necessary to position the object of detection accurately, thereby requiring additional large-scale equipment.

The positional relationship between the projector and the scattered light receptor is not always common to a plurality of configurations, so that it is impossible to deal with plural kinds of objects by one apparatus.

For these reasons, a chipping detection system which enables high-speed inspection by a small-scale apparatus and chipping detection at the corner portion, which is capable of easily positioning an object of detection, and which is capable of inspection of plural kinds of objects by one apparatus has been demanded.

The contour of the rail surface is conventionally bevelled by what is called chamfering so as to protect the contour against chipping.

If it is assumed that the chamfering angle for bevelling the contour of the rail surface so as to have an inclined surface is $\alpha$, when illuminating light enters the chamfered portion, it is reflected regularly in an oblique direction at an angle of $2\alpha$, so that only part of the light returns to an object lens.

Consequently, the chamfered portion is also dark in the detection like a chipped portion. Particularly, at the corner portion of the rail surface, since chamfering of the front surface is overlapped with chamfering of the side surface, the chamfering angle is apt to become large, thereby exerting great influence on the detection.

Therefore, since the corner portion becomes round on the binary image and the portion appears as if it had a defect, false information which judges the normal part as a defect is sometimes produced.

SUMMARY OF THE INVENTION

Accordingly, it is an object of the present invention to eliminate the above-described problems in the prior art and to provide a chipping detection system and method which has a simple structure and is capable of detecting chipping at a high speed without missing and being influenced by the position or the situation of an object of detection.

It is another object of the present invention to provide a chipping detecting system and method which are capable of detecting objects having various configurations by one detecting system.

It is still another object of the present invention to provide a chipping detecting system which is capable of accurately detecting the contour of the rail surface of a head portion without being influenced by chamfering.

To achieve this aim, in the present invention, binary image of an object of detection is formed and stored, the boundary coordinates are detected by tracing the boundary of the object of detection from the stored binary image, the points on the boundary are consecutively moved and a chipping size is detected from the coordinates at these points, and the presence or absence of chipping is judged from the chipping size.

As the method of tracing the boundary, a method of determining the direction of tracing by matching the binary image with eight kinds of $3 \times 3$ direction code patterns is adopted.

As the method of detecting the chipping size, a method of reading out $2k+1$ coordinate values from the matrix of boundary coordinates, calculating $2k-1$ chipping sizes from the respective three coordinate values at both end points and an intermediate point thereof, and iteratively detecting the true chipping size from the thus-obtained chipping sizes is adopted.

A chipping detecting system of the present invention comprises: an illuminating means for illuminating an object of detection; an image detecting means for detecting the reflected image of the object of detection; an illumination angle controlling means for so controlling the illumination angle of the illuminating light that the reflected image of a detection surface of the object of detection is within the maximum reflection angle that enables detection by the image detecting means when the illuminating light illuminates the inclined detection, surface of the object of detection and an illumination range restricting means for restricting the illumination range to the range of the detected pixels of the image detecting means.

The above and other objects, features and advantages of the present invention will become clear from the following description of the preferred embodiments thereof, taken in conjunction with the accompanying drawings.

BRIEF DESCRIPTION OF THE DRAWINGS

FIGS. 2 to 4 are explanatory views of the principle of chipping size detection in accordance with the present invention;

FIG. 8 shows the direction code patterns for boundary tracing;

FIGS. 9 to 11 are explanatory views of a boundary tracing method;

FIG. 15 shows a $\tan^{-1}$ table, which is an example of the ROM tables shown in FIG. 14;

FIG. 20 shows a ROM table;

DETAILED DESCRIPTION OF THE PREFERRED EMBODIMENTS

Figure 1:
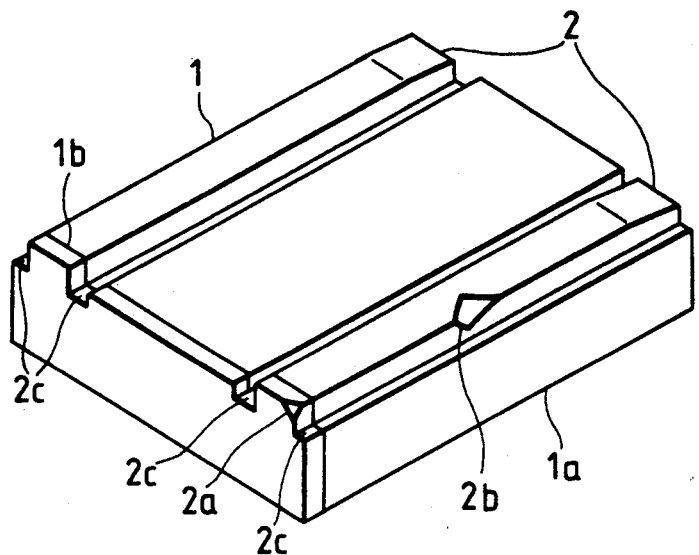
FIG. 1 is a perspective view of a slider, which is one of the objects being detected in the present invention.

FIG. 1 shows a slider of a thin film magnetic head which is an object of detection. In FIG. 1, the reference numeral 1 represents a slider, 1a an opaque portion of the slider, 1b a translucent portion of the slider, 2 a rail part, 2a, 2b chippings generated at the rail part 2, and 2c a trench.

The principle of chipping detection in the present invention will first be explained.

Figure 2:
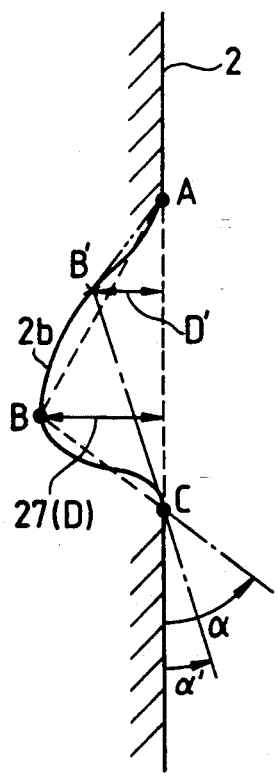

FIG. 2 is an enlarged view of the boundary portion of the binary image of the rail part 2 having the chipping 2b such as that shown in FIG. 1. As is clear from FIG. 2, the chipping width D' of the detected binary image which corresponds to the height of the triangle AB'C determined by the three points A, B' and C on the rail part 2 is represented by the following formula:

$$D' = \overline{B'C} \cdot \sin \alpha'.$$

The chipping width of the chipping 2b to be obtained is the chipping width D which is the maximum at the point B on the boundary. In order to obtain the chipping width D, while the intermediate point B' of the three points A, B' and C is consecutively moved along the boundary, the chipping widths (the heights of the triangles) corresponding to the respective intermediate points B' are consecutively obtained. The chipping width D' takes a negative value when the angles ', $\alpha'$ are set in the direction shown in FIG. 2. Therefore, the minimum value (the maximum value in absolute value) detected from the calculated chipping widths D' (minus value) is the chipping width to be obtained. This value is represented by $$D = \overline{BC} \cdot \sin \alpha$$

wherein $$BC = \sqrt{(x_b - x_c)^2 + (y_b - y_c)^2}$$

and $x_b$, $y_b$ and $x_c$ and $y_c$ are the coordinate values of B and C, respectively.

A more generalized chipping detection method will be explained with reference to FIG. 3. FIG. 3 is a boundary coordinate table 9 listing the x coordinate and the y coordinate in each of the boundary coordinates (this will be described later). From this table 9, $2k+1$ continuous coordinates (coordinates Nos. $p-l_1$ to $p+l_2$, wherein $l_1$ and $l_2$ are all integers that satisfy the condition $l_1+l_2=2k$) on the boundary are simultaneously read out to calculate the $2k-1$ chipping widths. In this case, the chipping widths $D_{l_1, l_2}$ is represented by the following formula:

$$D_{l_1,l_2} = \sqrt{(x_p - x_{p+l_2})^2 + (y_p - y_{p+l_2})^2} \quad (1)$$

$$\sin\left(\tan^{-1}\left(\frac{y_p - y_{p+l_2}}{x_p - x_{p+l_2}}\right) - \tan^{-1}\left(\frac{y_{p+l_2} - y_{p+l_1}}{x_{p+l_2} - x_{p+l_1}}\right)\right)$$

$D_{l_1, l_2}$ also takes a negative value in the case of the chipping 2b shown in FIG. 2. The target chipping width is obtained by calculating the values $D_{l_1, l_2}$ with respect to all positive integers $l_1$, $l_2$ that satisfy the condition $l_1 + l_2 = 2k$ and calculating the following formula to obtain the minimum value $D_{p'}$:

$$D_{p'} = \min_{l_1+l_2=2k} D_{l_1 \cdot l_2} \quad (2)$$

For this calculation, the point B is fixed in place of moving the point B' and the points A, C on both sides of B are moved while keeping the spaces A, B and C constant in FIG. 2.

The corner portion and the detection of the chipping 2a generated at the corner portion will now be explained. If the same method is applied to the corner portion as in FIG. 2, the corner potion is detected as a kind of a projection. This state is shown in FIG. 4(a). When the three points A, B and C have a relationship AB=BC=k, the height of the triangle is the maximum, the value being $k/\sqrt{2}$. The state of the corner portion having the chipping 2a is shown in FIG. 4(b). In this case, when AB=BC=k, the height of the triangle is also the maximum, but the value is smaller than the corner portion having no chipping. Therefore, by calculating the following formula from the height $D_{k,k}$ of the triangle ABC satisfying the relationship AB=BC=k and comparing this value with the value obtained when the corner portion has no chipping, a chipping of the corner portion is detected:

$$D_p = D_{k, k} \qquad (3)$$

At the corner portion both the height of the triangle having no chipping and the height $D_p$ of a chipped triangle having take positive values.

The corner portion and the chipping generated at the corner portions are detected in the middle of successive calculations in accordance with the boundary coordinate table 9 shown in FIG. 3.

Figure 5A:
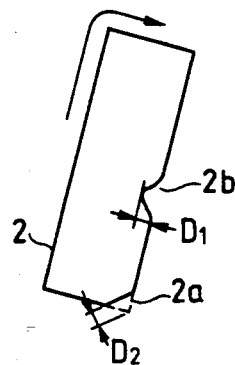
FIG. 5 is an explanatory view of a method of representing the configuration of a binary image in accordance with the present invention.
Figure 5B:
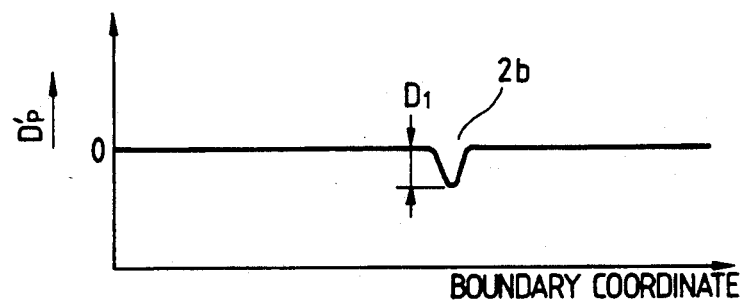
Figure 5C:
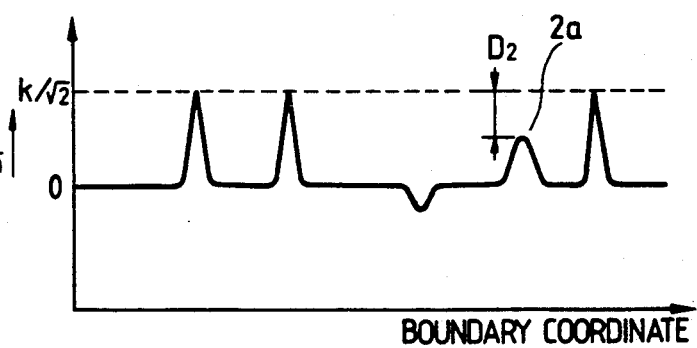

FIG. 5 shows the state in which the values $D_{p'}$, $D_p$ are detected along the boundary of the rail part 2. FIGS. 5(b) and 5(c) show the relationships between the boundary coordinates and $D_{p'}$ and $D_p$, respectively, of an object shown in FIG. 5(a) which are detected in the direction indicated by the arrow along the boundary of the rail part 2. In this way, the chipping 2b of the edge is detected by $D_{p'}$, while the chipping 2a of the corner portion is detected by the value of $k/\sqrt{2}-D_p$ (or $AC/2-D_p$).

As described above, according to the structure of the present invention, the chipping width can be accurately calculated from the matrix of rail par boundary coordinates of the detected binary image over the entire periphery of the rail. In addition, since these calculations are not influenced by the position or the situation of the slider and it is possible to obtain the chipping width accurately from a few items of data, the problems in the prior art are eliminated.

An embodiment of the present invention will be explained while citing a chipping detection of the rail part of a slider as an example.

Figure 6:
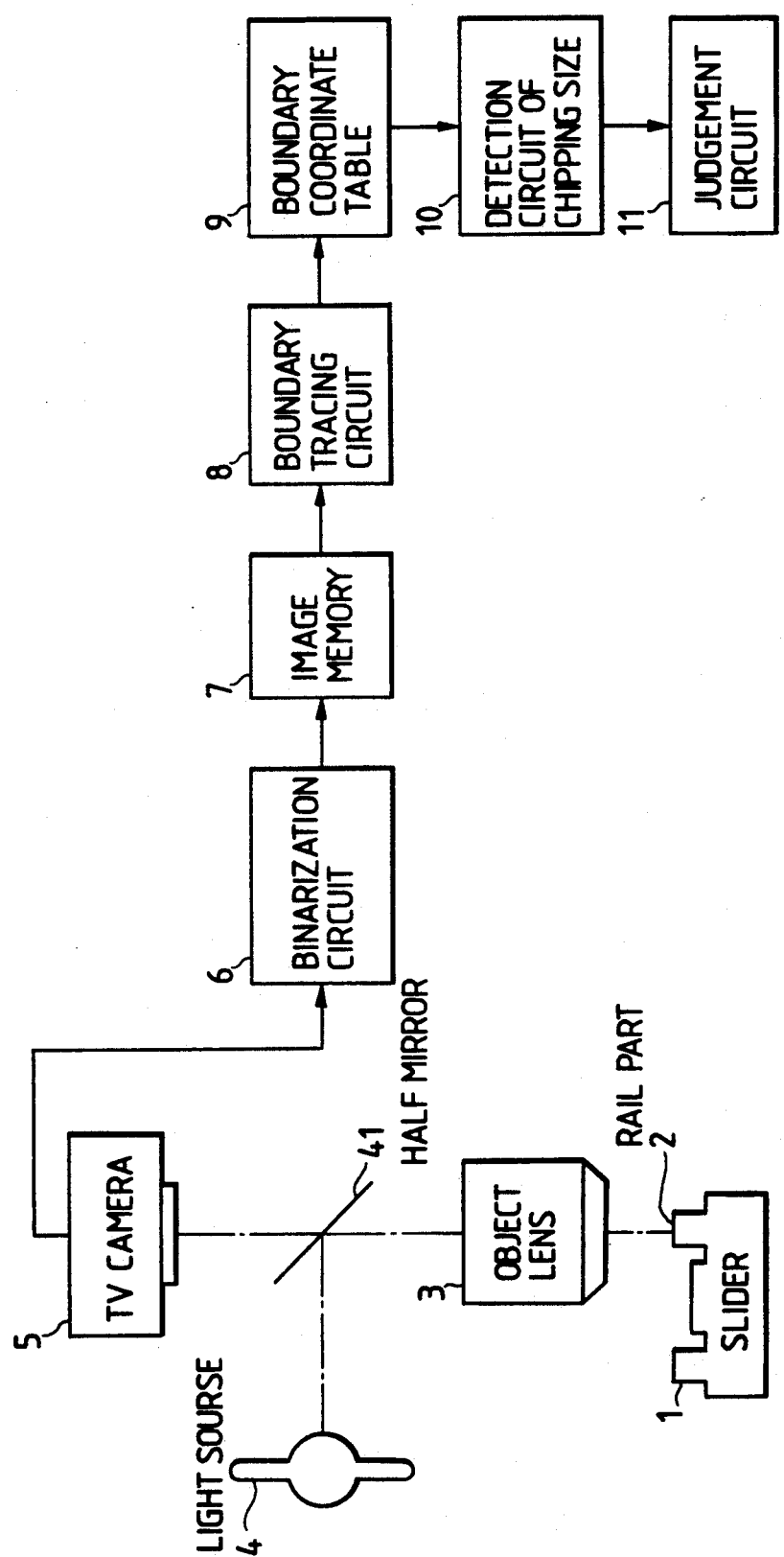
FIG. 6 shows the structure of an embodiment of a chipping detection system according to the present invention.

FIG. 6 shows the structure of this embodiment. In FIG. 6, the rail part 2 of the slider 1 is illuminated in a bright field by a light source 4 through a half mirror 41 and an object lens 3 and is detected by the TV camera 5 which is used as a photoelectric converter. As the photoelectric converter, a linear image sensor, a TV camera and the like are usable, and a TV camera 5 is used in this embodiment. An electronic image detected by the TV camera 5 is binarized by a binarization circuit 6. In this detection, the rail part 2 is bright and the other parts are dark, so that the rail part 2 takes a value of 1, the other parts taking a value of 0. The binary image output from the binarization circuit 6 is stored by an image memory 7. A boundary tracing circuit 8 traces the boundary of the rail part 2 of the stored binary image in a later-described method and successively writes the detected boundary coordinate values x, y into the boundary coordinate table 9, as shown in FIG. 3.

The chipping size detection circuit 10 reads out 2k+1 boundary coordinate values from the boundary coordinate table 9 successively and calculates the chipping widths $D_{p'}$, $D_p$ along the boundary, as explained with reference to FIG. 3. A judgment circuit 11 judges as to whether or not the chipping widths represent a defect from the waveforms of the data on the chipping widths $D_{p'}$, $D_p$.

Figure 7:
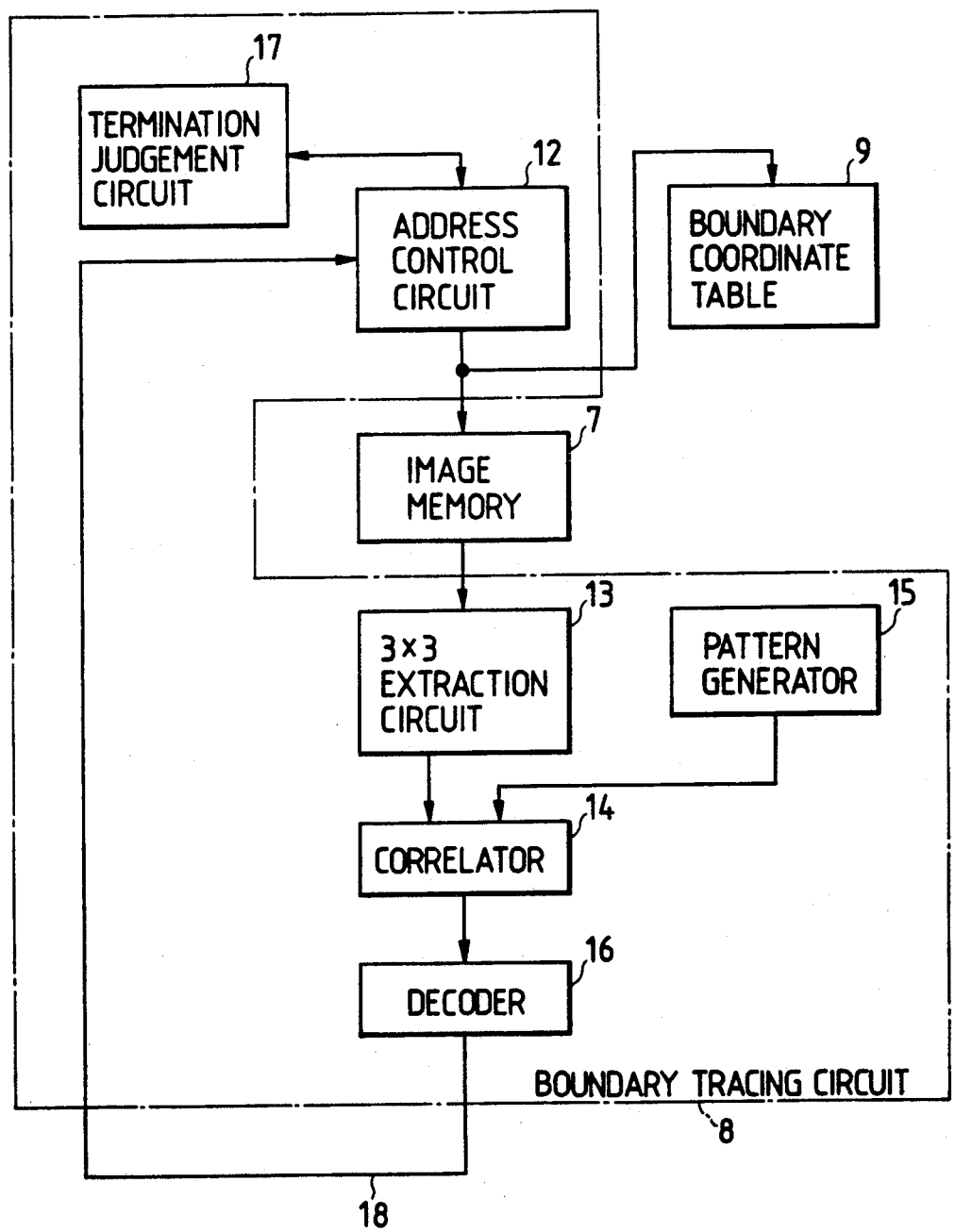
FIG. 7 shows the structure and the operation of a boundary tracing circuit in the embodiment shown in FIG. 6.

The structure and the operation of the boundary tracing circuit 8 will be explained hereinunder in detail with reference to FIG. 7. In FIG. 7, the image memory 7 has a size of, for example, 1024 pixels×2048 pixels×1 bit, and the address thereof is controlled by an address control circuit 12. A 3×3 extraction circuit 13 continuously extracts the image data of 3×3 pixels from the image memory 7 along the boundary. A pattern generator 15 generates eight kinds of patterns shown in FIG. 8, and a correlator 14 correlates these patterns as with the outputs of the 3×3 extraction circuit 13. On the basis of the results of these matchings, a decoder 16 outputs UP/DOWN signals 18 of the respective x and y coordinates. The UP/DOWN signal 18 controls the address control circuit 12, which, in turn, generates the next boundary coordinates in preparation for the operation at the next boundary point. At the same time with this, the output of the address control circuit 12 is added to the boundary coordinate table 9. The boundary coordinate table 9 is sufficed with a memory capacity of at most 96 kilobits on the assumption that the x and y coordinates each require 12 bits, and the boundary length is 4096 pixels. A termination judgment circuit 17 judges the termination of boundary tracing. When the illuminating light passes the starting point again, and the direction code at this point which will be described later agrees with the direction code of the starting point, the tracing operation is finished.

Figure 10:
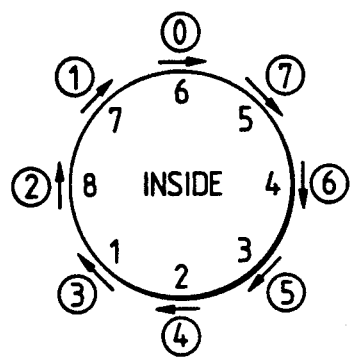
Figure 11:
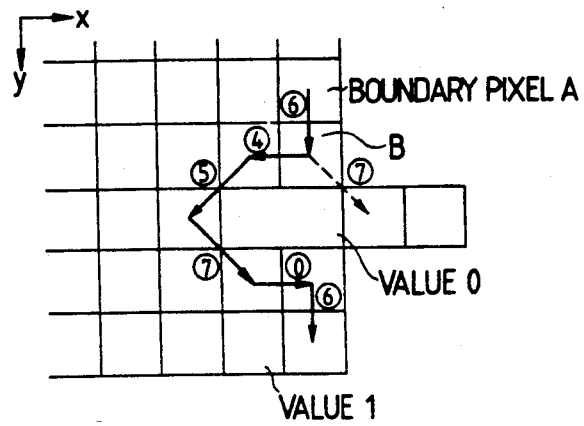

The boundary tracing operation of the boundary tracing circuit 8 is carried out with respect to the pixels having value 1 in eight connections. FIG. 9 shows the relationship between the eight kinds of direction code patterns shown in FIG. 8 and the UP/DOWN signals 18 of the respective x and y coordinates output from the decoder 16. Some detected images generate a branch, as shown in FIG. 11. As a countermeasure, the priority order is provided for each direction code pattern, as shown in FIG. 10, and the correlator 14 matches the binary image with the corresponding direction code pattern. To state this concretely with reference to FIG. 11, in a pixel A, since the detected binary image agrees with the direction code pattern No. (6), the direction code pattern No. (6) is selected. In accordance with the table shown in FIG. 9, 0 and +1 are selected as the x UP/DOWN signal and the y UP/DOWN signal, respectively, and a pixel B is obtained as the next boundary. In the pixel B, the binary image is matched both with the direction code patterns Nos. (4) and (7), but the priority order is given in correspondence with the direction code pattern No. (6) of precedent pixel A, as (3)→(4)→(5)→. . . →(1)→(2), as shown in FIG. 10, so that the direction code pattern No. (4) is selected. In this way, the boundary tracing operation is executed so as to accurately detect a chipping.

Figure 12:
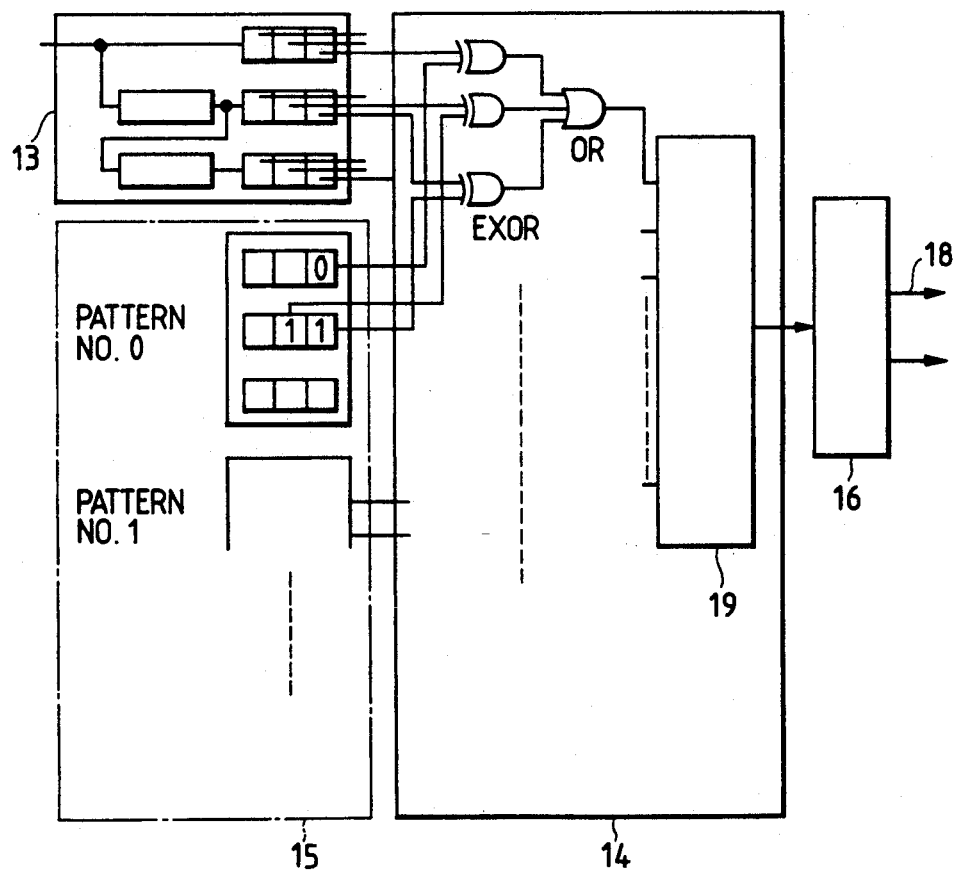
FIG. 12 is an explanatory view of the correlation of the outputs of a 3 x 3 extraction circuit with the direction code patterns.
Figures 13, 14:
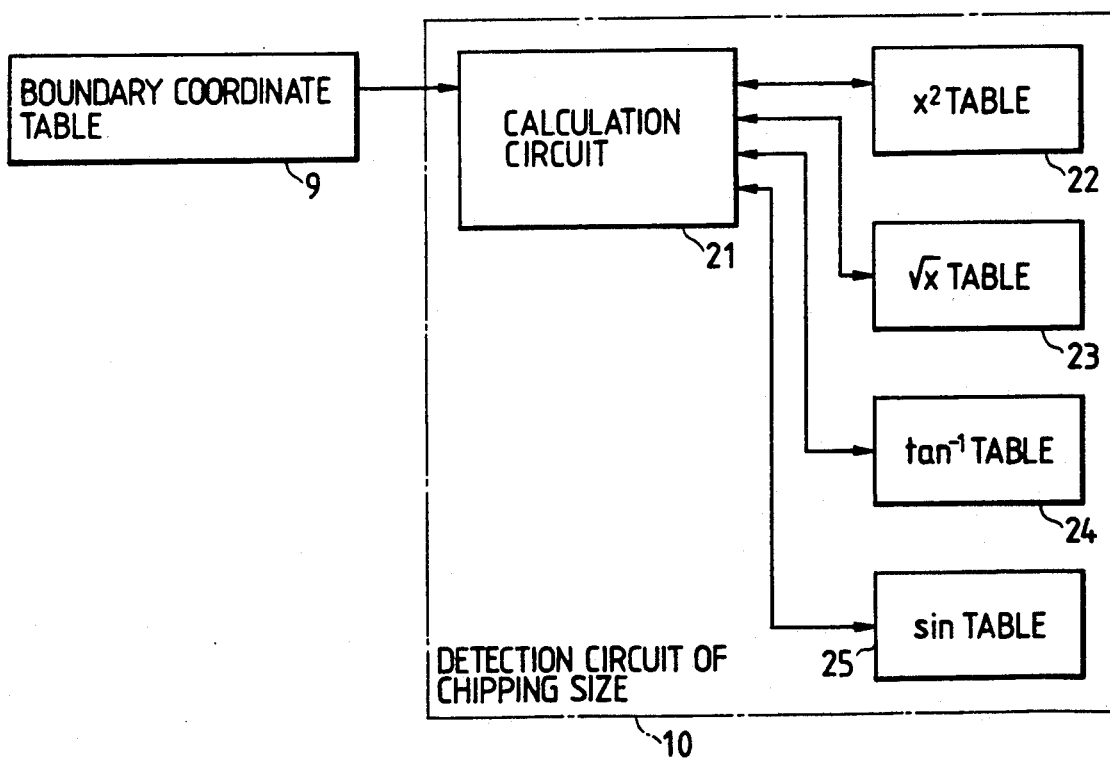
FIG. 13 shows the function of a priority ordering circuit.
FIG. 14 shows the structure of a chipping size detection circuit in FIG. 6.

FIG. 12 shows the method of correlating the outputs of the 3×3 extraction circuit with the eight kinds of direction code patterns from the pattern generator 15. In FIG. 12, between the output of the 3×3 extraction circuit 13 composed of a shift register group and each of the direction code patterns, an exclusive logical sum EXOR is taken, and with respect to all pixels except a don't care pixel, the logical sum OR thereof is taken. The output of the logical sum OR is input to the priority ordering circuit 19, wherein the priority order is determined on the basis of the direction code of the preceding boundary pixel and the matching direction code is input to the decoder 16, thereby generating the UP/DOWN signal 18. The priority ordering circuit 19 and the decoder 16 are realized by using a PLA (Programmable Logic Array) or the like. FIG. 13 shows the function of the priority ordering circuit 19. The priority order shown in FIGS. 10 and 13 are in the case in which the direction codes are given clockwise, as shown in FIG. 10.

The boundary coordinates obtained in this way are written in the boundary coordinate table 9, and a chipping size is detected from the matrix of boundary coordinates written therein by the chipping size detection circuit 10 having a structure shown in FIG. 14. In FIG. 14, the boundary coordinates output from the boundary coordinate table 9 are input to a calculation circuit 21 of the chipping size detection circuit, and the chipping width $D_{p'}$ at the edge and the chipping width $D_p$ at the corner portion are calculated at a high speed from the formulas (1), (2) and (3) with reference to an $x^2$ table 22, an $\sqrt{x}$ table 23, a $\tan^{-1}$ table 24 and a sin table 25. As the calculation circuit 21, for example, a DSP (Digital Signal Processor) is usable.

FIG. 15 shows an example of the $\tan^{-1}$ table. The memory capacity required is different depending upon the interval $l_1$ between the points A and B' shown in FIG. 2 or the interval $l_2$ between the points B' and C. In the case of the example shown in FIG. 15, the memory capacity required is only 1 kilobit even if $l_2=5$.

Finally, the judgment circuit 11 will be explained. When a chipping width of 5 pixels or more is judged to be a defect, if $$|D_{p'}| \leq 5$$

it is judged that there is a defect at the edge, and if $$k/\sqrt{2} - DP \geq 5,$$

it is judged that there is a defect at the corner portion.

As described above, according to this embodiment having the above-described structure, since the chipping widths are continuously obtained at the boundary points of the rail part 2, it is possible to detect the size of a chipping generated at the rail part 2 over the entire periphery at a high speed by a simple structure. It is thus possible to detect the exact position at which the chipping is generated. It is also possible to judge the suitability of the rail size by checking the interval by the judging circuit 11.

In this embodiment, the object of detection is a rectangular slider rail such as that shown in FIG. 1, but the present invention is applicable in principle to any polygonal object. That is, by tracing the boundary of a polygonal object and obtaining $D_{p'}$ and $D_p$ in the same way as in this embodiment, the size and the position of a chipping produced on the polygonal object can be detected. Since a circle is approximated by a polygon, a chipping produced on a circular object can naturally be detected.

It is also possible to represent the shape of the binary image by using $D_{p'}$ and $D_p$ obtained in this embodiment. The example shown in FIG. 5 is obtained by representing the rectangular shape in a one-dimensional waveform (in other words, converting the image into a waveform). The configuration is not restricted to a rectangle but that a given polygonal can be represented in the same way.

Although the detection of chipping an object of detection has been explained in this embodiment, it is also possible to detect a convex defect by the method of the present invention. More specifically, if there is a convex defect, the value $D_{l_1 \cdot l_2}$ obtained from the formula (1) takes a positive value, so that the convex defect is detected by calculating the following formula:

$$D_{p''} \max_{l_1+l_2=2k} \{D_{l_1 \cdot l_2}\} \tag{4}$$

Accordingly, it is possible to detect a convex defect or a concave produced on a given polygonal object by calculating $D_{p''}$ in addition to $D_{p'}$ and $D_p$.

Thus, according to this embodiment, it is possible to detect chipping of an object at a high speed by a simple structure without missing or being influenced at all by the position or the situation of the object of detection. In addition, it is possible to detect objects having various configurations by one detecting system.

A second embodiment of a chipping detecting method according to the present invention will be explained in the following.

Figure 16:
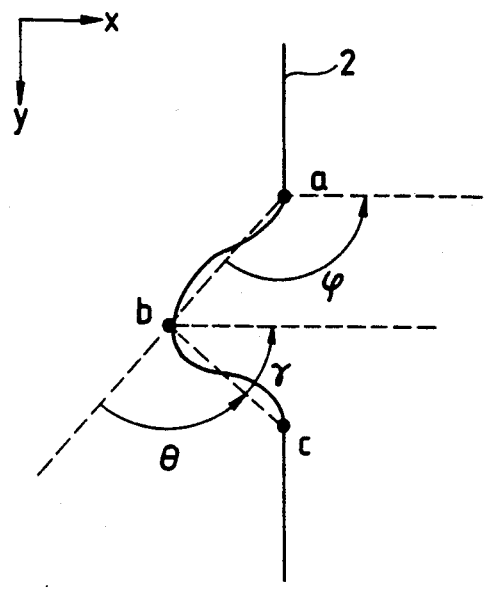
FIG. 16 is an explanatory view of a curvature.

Three points a, b and c on the boundary are first selected and the degree of deviation from a straight line is regarded as a curvature or a chipping width. The angle $\theta$ formed between the straight line ab and the straight line bc is regarded as a curvature, as shown in FIG. 16, and the distance D between the straight line and the point b is regarded as a chipping width. If it is assumed that the coordinates of the point a are $(x_a, y_a)$, the coordinates of the point b are $(x_b, y_b)$, the coordinates of the point c are $(x_c, y_c)$, the angle formed between the straight line ab and the normal line of the boundary of the rail 2 at the point a is $\psi$, the angle formed between the straight line bc and the normal line of the boundary of the rail 2 at the point b is $\gamma$, and the angle formed between the straight line ac and the normal line of the boundary of the rail 2 at the point c is $\alpha$, $$\psi = \tan^{-1}\frac{(y_b - y_a)}{(x_b - x_a)}$$

$$\gamma = \tan^{-1}\frac{(y_c - y_b)}{(x_c - x_b)}$$

$$\theta = \psi - \gamma$$

$$D = bc \cdot \sin\alpha$$

$$bc = \sqrt{(x_b - x_c)^2 + (y_b - y_c)^2}$$

Figures 18A, 18B:
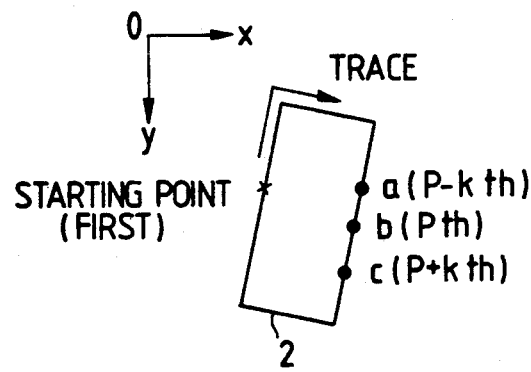
FIGS. 18(a) and 18(b) are explanatory views of boundary coordinate tables.
Figure 19A:
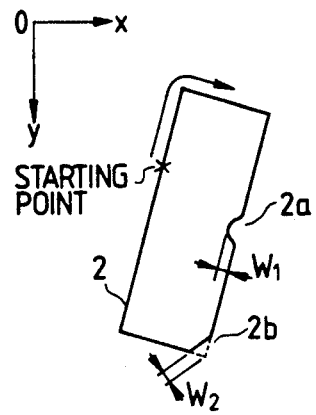
FIGS. 19(a), 19(b) and 19(c) are explanatory views of the waveforms of a curvature and a chipping width.
Figure 19B:
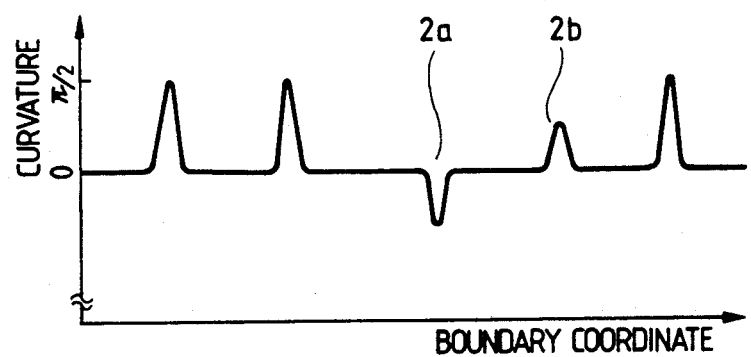

In order to calculate the curvature $\theta$ and the chipping width D subsequently, the boundary of the rail part 2 is traced consecutively clockwise, as shown in FIG. 18, thereby detecting the boundary coordinates successively and selecting three points on the boundary which are apart from each other by the distance of k pixels. The curvature $\theta$ obtained is zero if the straight-line boundary is normal, while it takes a negative value if there is a chipping 2a, as shown in FIGS. 19(a) and 19(b). At the corner portions a, b, c and d in FIG. 19(a), if the corner portion is normal, the curvature $\pi/2$, as indicated by a, b and d in FIG. 19(b), while if there is the chipping 2b, the value becomes smaller than $\pi/2$. In this way, the presence or absence of chipping is detected by the curvature 8. It is possible to obtain the curvature $\theta$ at a high speed and with a small memory capacity with reference to a table which has stored the values which can be taken at the angle $\gamma$ (similarly, at the angle $\gamma$)' as shown in FIG. 20. The memory capacity is different depending on the interval k between the points a, b and c. For example, when k=5, as shown in FIG. 20, 1 kilobit is required, when k=10, 4 kilobits are required, and even when k=20, the memory capacity required is only 14 kilobits. In addition, it is unnecessary to create the boundary coordinate table shown in FIG. 18(b) before obtaining the curvature $\theta$ and it is possible to obtain the curvature 8 at a high speed while tracing the boundary.

Figure 17:
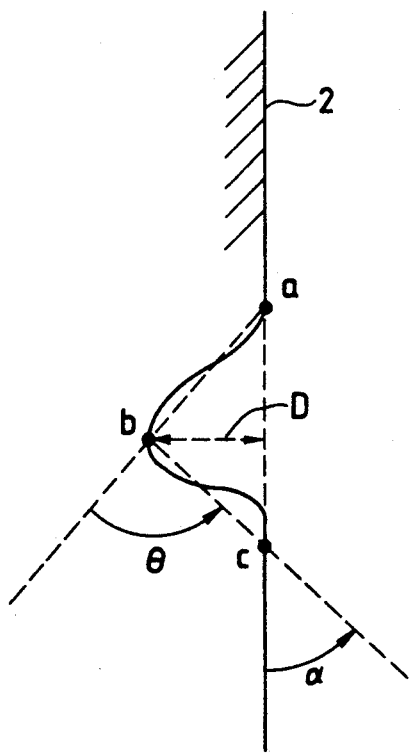
FIG. 17 is an explanatory view of a chipping width.
Figure 19C:
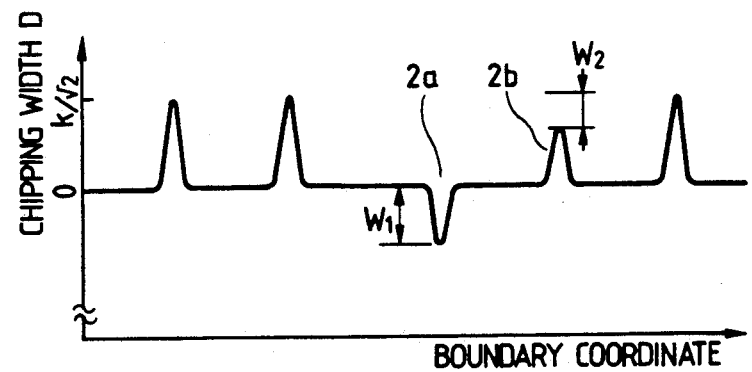

The chipping width D obtained by the method shown in FIG. 17 is equivalent to the height of the triangle abc, and if the straight-line boundary is normal, the chipping width D becomes zero, while if there is the chipping 2a, the chipping width D is equal to the chipping width $W_1$, as indicated by a, b and c in FIG. 19(c). At the corner portion, in a normal state, the chipping width D takes a value $k/\sqrt{2}$ as indicated by a, b and d in FIG. 19(c), while if there is the chipping 2b, the value becomes smaller than 2. In this case, $k/\sqrt{2}-D$ is equal to $W_2$. In this way, by obtaining the chipping width D consecutively at the boundary points, it is possible to obtain the size of a chipping accurately produced on the entire periphery of the rail. The chipping width D can also be obtained at a high speed with a small memory capacity by adopting the table reference system in the same way as for the curvature $\theta$.

Both embodiments dispense with additional equipment such as a slider alignment device, because they are quite free from the influence of the position or the situation of the rail. In both embodiments, it is possible to inspect various kinds of objects by one detecting system.

When the chipping width D is obtained, the angle $\alpha$ is obtained as $\alpha=0$ by exchanging the coordinates b with the coordinates c (b$\leftrightarrow$c) and substituting $\pi=\theta$ into $\theta$ ($\theta\rightarrow\pi-\theta$) in the calculation of curvature $\theta$. The angle $\alpha$ can therefore be detected by the same hardware.

Through the use of the method of the second embodiment, in particular chipping on the straight-line boundary is constantly detected as a negative value, so that chipping alone is easily detected without the need for any special means.

The structure of a chipping detection system for realizing the method of the second embodiment is the same as that of the first embodiment shown in FIG. 6 except that the chipping size detection circuit 10 calculates the chipping width D by consecutively reading out the coordinates of the three points a, b and c which are apart from each other by the distance of k pixels from the boundary coordinate table 9, and with reference to the angles $\psi$ and $\gamma$ shown in FIG. 17 and the ROM table 21 which has stored bc. The judgement circuit 11 judges the presence or absence of a chipping from the waveform of the calculated chipping.

Figure 21:
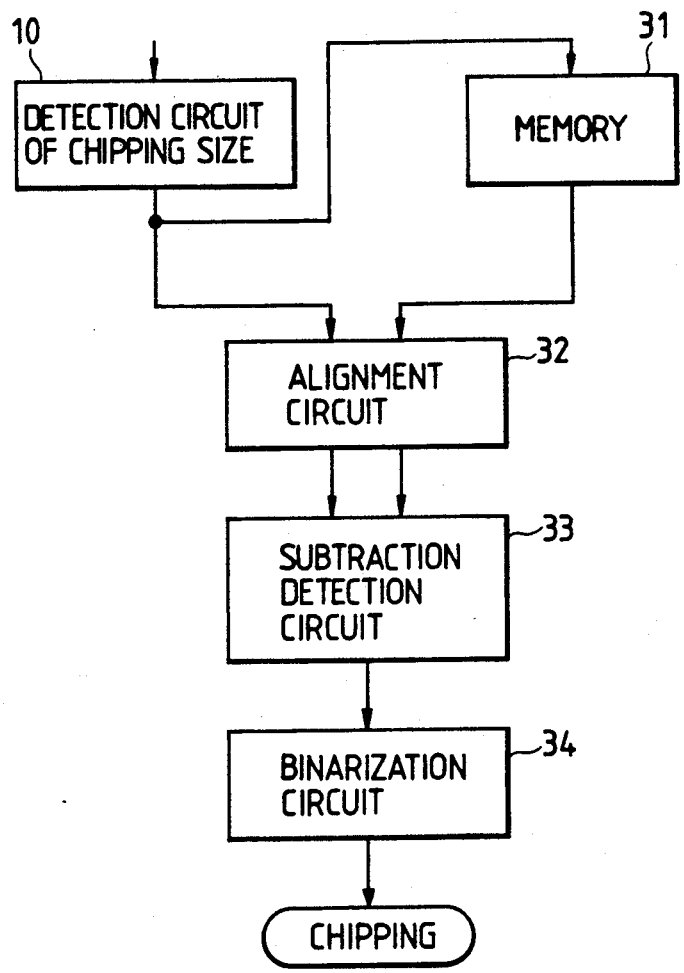
FIGS. 21, 22(a), 22(b), 22(c) and 22(d) are explanatory views of the inspection by a comparison between two chips.
Figure 22A:
Figure 22B:
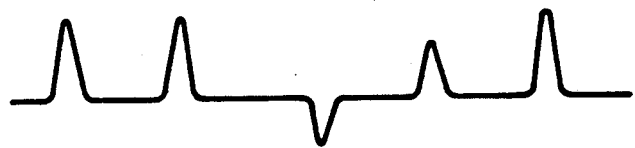
Figure 22C:
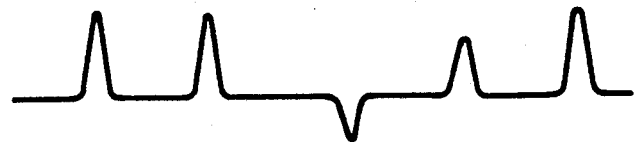
Figure 22D:
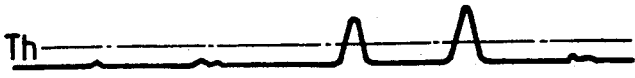

A third embodiment of a detection method of the present invention will next be explained with reference to FIG. 21. In this embodiment, chipping is detected by comparison. The slider has two rails, as shown in FIG. 1, and these rails are compared. The chipping width of the left rail is first obtained and the output of the chipping size detection circuit 10 is first stored in a memory 31. The chipping width of the right rail is next obtained and, in an alignment circuit 32, the corners of the chipping width waveforms of the left and right rails are arranged in alignment. A subtraction detection circuit 33 calculates a subtraction of these chipping width waveforms, and a binarization circuit 34 binarizes the subtraction, thereby detecting a chipping. FIG. 22 shows these waveforms. FIG. 22(a) shows the chipping width waveform f detected from the left rail, and FIG. 22(b) the chipping width waveform g detected from the right rail. Between these waveforms f and g, there is a positional deviation. By shifting the waveform g to the right using the alignment circuit 32, the shifted waveform g' is obtained, as shown in FIG. 22(c). By obtaining the subtraction waveform $|f-g'|$ between the waveforms f and g', as shown in FIG. 22(d), a chipping is detected. The symbol Th represents a threshold value of binarization.

It is also possible to compare the rails between different sliders according to this embodiment.

Figure 23:
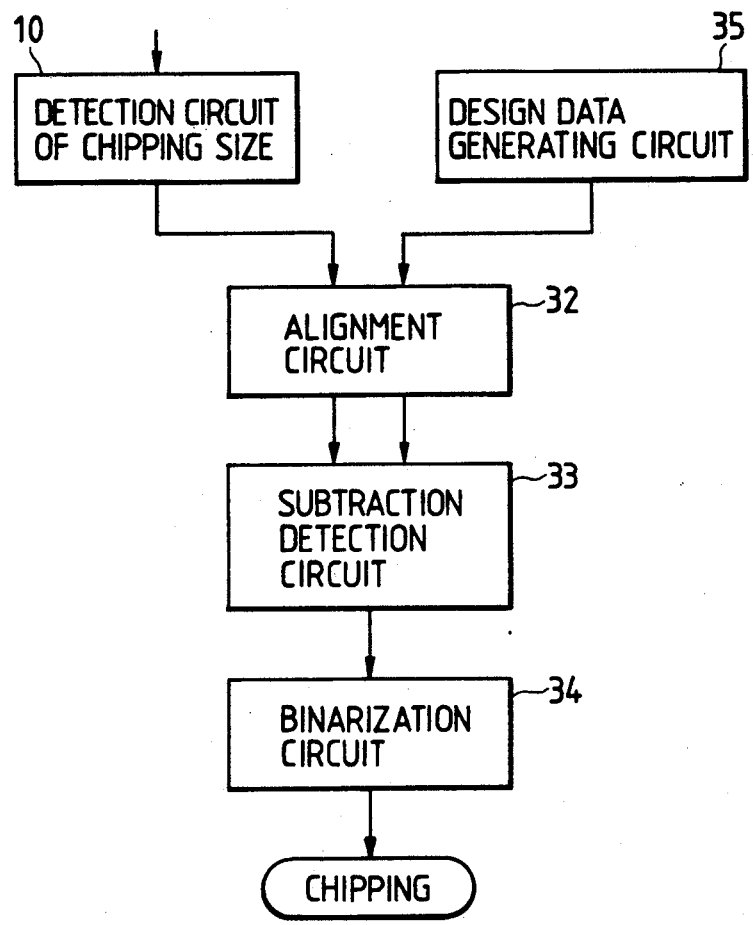
FIG. 23 is an explanatory view of the inspection by a comparison with design data.

It is also possible to generate the ideal chipping width waveform by a design data generating circuit 35, as shown in FIG. 23, and to compare this waveform with a detected waveform.

The curvature $\theta$ can be detected by the same structure as in this embodiment.

Although the curvature $\theta$ and the chipping width D are obtained from the coordinates of three points on the boundary in the second and third embodiments, as shown in FIGS. 16 and 17, it is also possible to detect these values by obtaining the average coordinates $$\left(\bar{x}_a = \frac{1}{i} \Sigma x_{ai}, \bar{y}_a = \frac{1}{i} \Sigma y_{ai}\right) \text{from a plurality of points}$$

Figure 24:
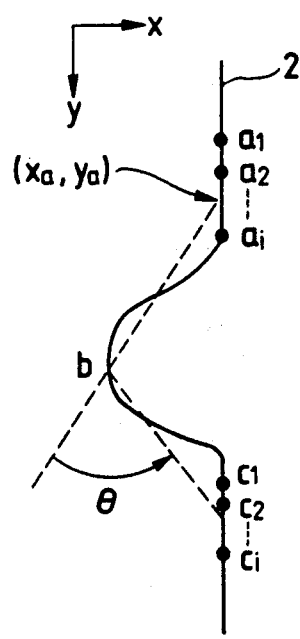
FIG. 24 is another explanatory view of a method of detecting a curvature.

$a_l$ to $a_i$ on the boundary, as shown in FIG. 24.

In a general boundary tracing operation, after the $\theta$ eight kinds of directions of tracing are inspected successively, the direction of tracing is determined. In the second and third embodiment, however, the curvature or the chipping width is detected from the detected coordinates while tracing the boundary. In other words, according to this system, the determination of the direction of tracing and the examination of the eight kinds of directions are simultaneously carried out, whereby the direction of tracing is determined in ⅛ the time required in the prior art.

As a fourth embodiment, a method of illuminating an object of detection in a bright field will be explained hereinunder.

The principle thereof will first be explained.

Figure 25:
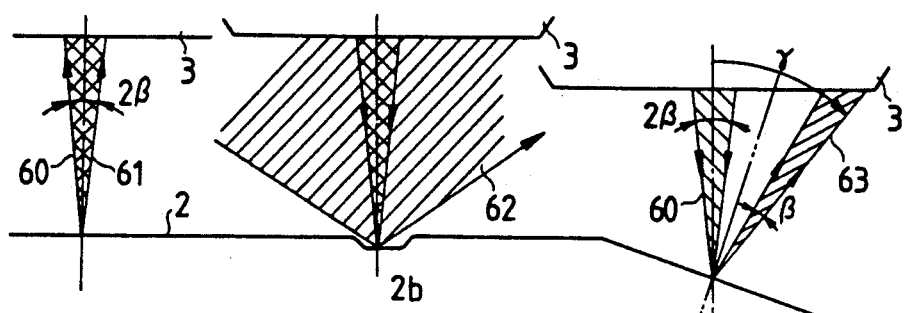
FIG. 25 is an explanatory view of the state of the rays of illumination regulated by an aperture stop.

FIG. 25 shows the state of incident rays in the state in which the aperture stop is diaphragmmed, wherein FIG. 25(a) shows the incident rays which have entered a flat portion, FIG. 25(b) shows the incident rays which have entered a chipped portion, and FIG. 25(c) shows the incident rays which have entered a chamfered portion.

In the case of the incident rays shown in FIG. 25(a), since the aperture stop is diaphragmed, the incident angle of the incident rays is restricted to the range indicated by the symbol $\beta$.

Nevertheless, all the incident rays are reflected upward and detected by the object lens 3 in the same way as in the case shown in FIG. 25(a).

In the case of having the chipping 2b as shown in FIG. 25(b), the incident rays to the chipping 2b are scattered at a wide angle and only a part of the incident rays are returned to the object lens 3, so that the chipping 2b is dark in the detection.

In the case in which the rays have entered the chamfered portion, as shown in FIG. 25(c), the rays are reflected at the maximum angle, namely, $2 \cdot \alpha + \beta$.

Accordingly, on the assumption that the maximum angle detectable by the object lens 3 is $2\gamma$, if optical systems of $\alpha$ and $\beta$ are so selected as to satisfy the following relationship:

$$\gamma \geq 2 \cdot \alpha + \beta \quad (5)$$

wherein $\alpha$ represents the chamfering angle, and $\beta$ the incident angle of illuminating light, all the rays which have entered the chamfered portion are returned to the object lens 3 in the same way as in the case shown in FIG. 25 (a), so that the chamfered portion can be detected with the same brightness as the flat portion.

On both sides of the rail surface (rail part) 2, the trench 2c is formed, as shown in FIG. 1. The trench 2c has not been subjected to mirror finish, and the illuminating light is reflected from the surface having a cutter mark remaining in a certain range of angle in the direction parallel to the longitudinal direction of the rail surface 2.

Figure 26:
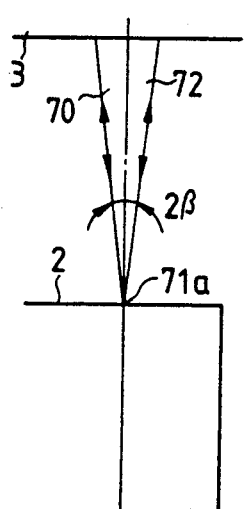
FIG. 26 is an explanatory view of the state of the trench of the rail surface illuminated with regulation by the aperture stop.
Figure 26:
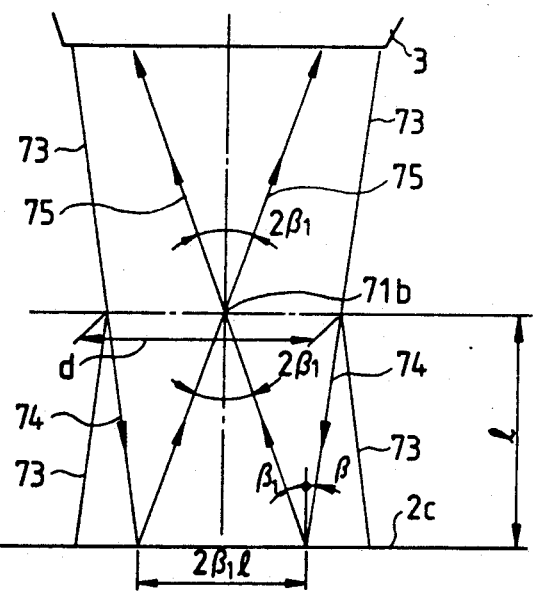

FIG. 26 shows the incident state of illuminating rays at the trench 2c. As shown in FIG. 26, when the enlarged image on the rail surface 2 is detected by an image sensor, the focus is adjusted to the rail surface 2 and the light irradiated from the point 71 on a sample corresponding to the image sensor is detected by the image sensor.

FIG. 26(a) shows the state of detecting the flat portion of the rail surface 2. Since the rail surface 2 is a focal surface, the quantity of light which has entered the detection point 71a of the image sensor is detected as it is.

FIG. 26(b) shows the state of detecting the trench 2c. The image sensor detects the rays passing the focal position 71b above the trench 2c.

If it is assumed that the light which has entered the trench 2c at an angle of $\beta$ is reflected at the maximum angle $\beta_1$, the illuminating rays directed in the direction toward the point which is apart straight downward from the focal position 71b by the distance of $$\left(1 + \frac{\beta}{\beta_1}\right)l$$

from among the illuminating rays wherein the illumination range has a width d which is represented by the following formula:

$$d = 2(\beta + \beta_1)l \quad (6)$$

wherein l represents the depth of the trench, are reflected from the trench 2c and detected by the image sensor.

As is clear from the above description, since the trench 2c converges illuminating rays from a wider range than the rail surface 2 for detection, the trench 2c is brighter than the rail surface 2 in the detection due to the reflectivity distribution for each reflecting angle of the trench 2c. As a result, when the outputs of the image sensor are binarized, a detection image such as that shown in FIG. 27 is obtained.

Figure 27:
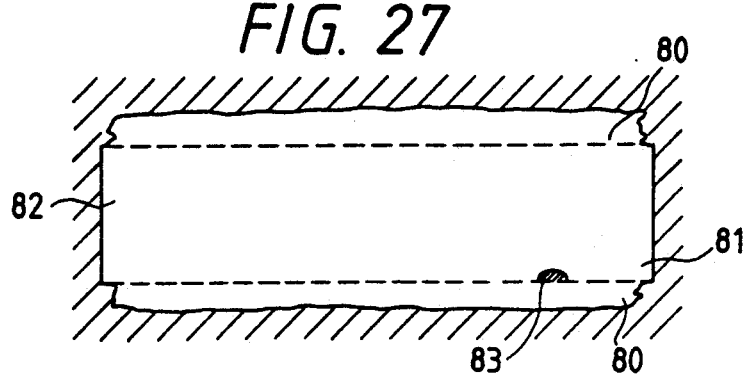
FIG. 27 is an explanatory view of an example of detection of the contour of the rail surface by illumination with regulation by an aperture stop.

The reference numeral 82 in FIG. 27 represents a rail surface 2, and both side portions 80 represent trenches 2c. Since the trenches 2c are brighter than the rail surface 2, they cannot be separated from the rail surface 2, thereby making the accurate tracing of the contour of the rail impossible.

A chipping 83, which constitutes an island-like portion in the bright portion in FIG. 27, cannot be detected.

The chamfered portion at the corner portion becomes bright in the detection.

The reason why the trench 2c is bright in the detection is that illuminating rays are converged from a wide range, as shown in FIG. 26(b).

Accordingly, if the illumination range is restricted to be smaller than the above-described illumination range d, it is possible to reduce the quantity of detected light at the trench 2c. Particularly in the case of detection using a linear image sensor, if an object of detection is illuminated in the form of a slit in accordance with the visual field of the linear image sensor, detection at a similar speed to that in a conventional system is enabled without restriction in the visual field.

Figure 28:
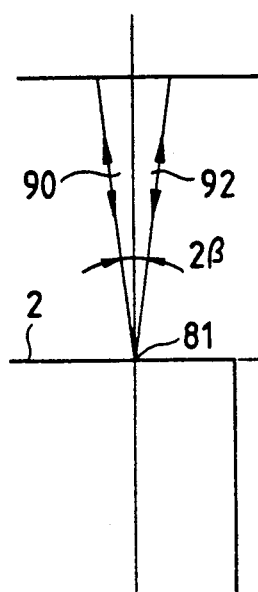
FIG. 28 is an explanatory view of the state of rays in accordance with the present invention.
Figure 28:
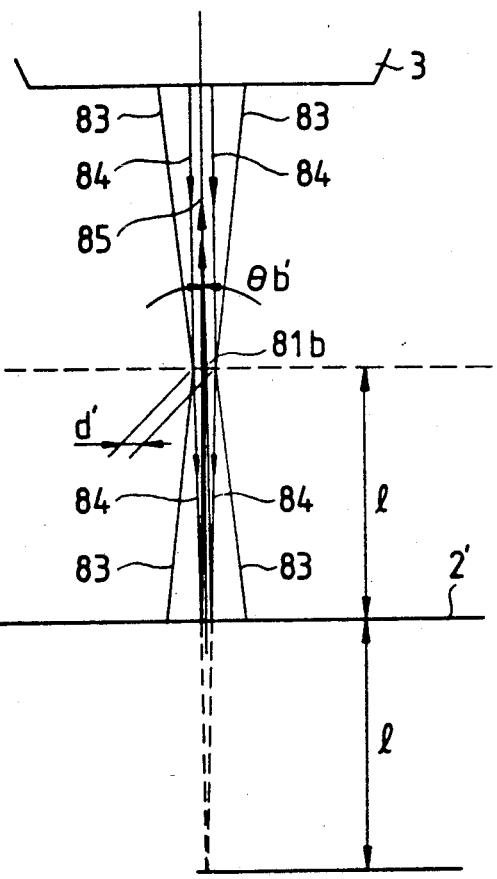

In view of this, in the present invention, the width of the illumination range is restricted to d', as shown in FIG. 28(b).

In this case, on the rail surface 2, even if the illumination range is restricted, there is no change in the quantity of detected light so long as the illumination range is larger than the size of the corresponding pixels of the image sensor on the rail surface 2.

Figure 29:
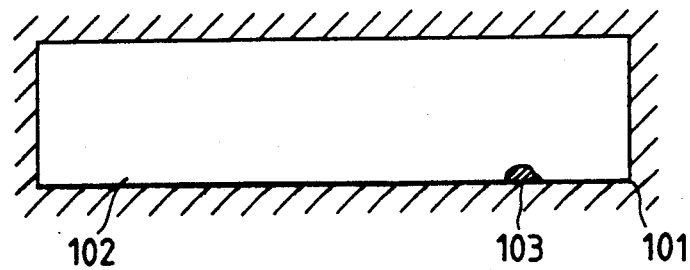
FIG. 29 is an explanatory view of an example of detection of the contour of the rail surface in accordance with the present invention.

At the trench 2c, however, the angle $\theta'_b$ of the light passing the corresponding point 81b of the image sensor is greatly reduced in correspondence with the case shown in FIG. 26, and only the light flux having an angle of $$\theta_b' = \frac{d'}{2l}$$

is detected. As a result, the trench 2c is dark in the detection and no trench 2c is detected on either side of a rail surface 102, as shown in FIG. 29. A chamfered portion 101 is also detected accurately. In addition, since a chipping 103 is located on the contour, it is possible to detect the chipping 103 by tracing the contour and inspecting both the convex and the concave defects.

FIG. 28(a) shows the case of detecting the flat portion of the rail surface. As shown in FIG. 28(a), since the rail surface 2 is the focal surface, the quantity of light which has entered the detection point 81a of the image sensor is detected as it is.

The preferred concrete structure for practicing the above-described illuminating method will be explained with reference to FIGS. 30 and 31.

Figure 30:
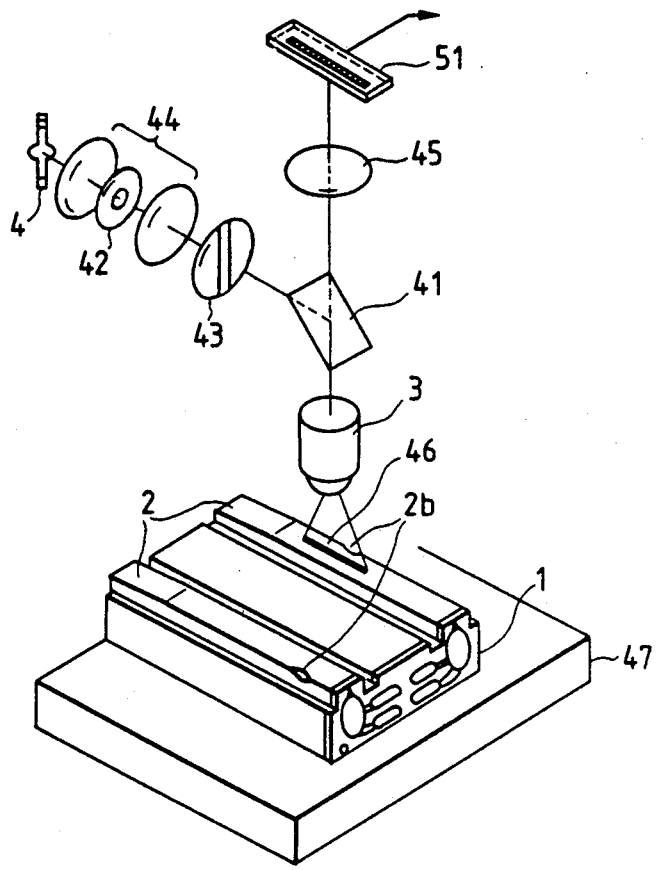
FIG. 30 is a perspective view of the structure of an illumination system in accordance with the present invention.

In FIG. 30, the reference numeral 4 represents the light source for illumination, 42 an aperture stop constituting an illumination angle controlling means in an illuminating optical system 44, 43 a slit constituting an illumination range restricting means, 41 a half-silvered mirror, 45 a relay lens, and 51 a linear image sensor corresponding to the TV camera 5 in FIG. 6.

Figure 31:
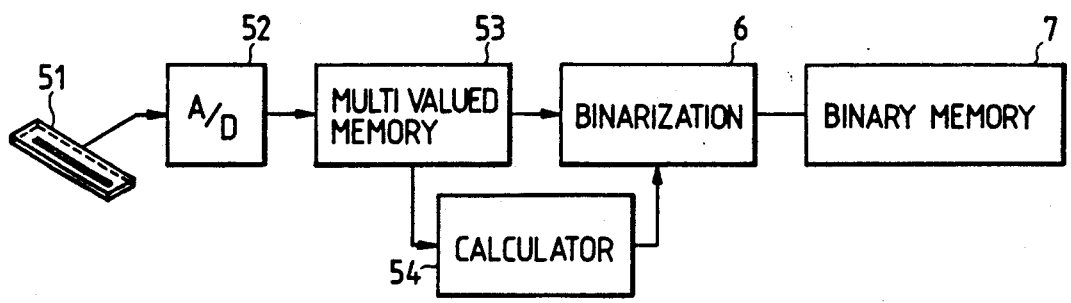
FIG. 31 shows the structure of electric circuitry useful in the present invention.

In FIG. 31 showing the structure of a chipping detection circuit, the reference numeral 52 represents an AD converter, 53 a multi-valued memory and 54 a threshold value calculator. In FIG. 31, the structure subsequent to the binarization circuit 6 is the same as in FIG. 6.

The threshold value calculator 54 is composed of a microprocessor or a digital signal processor.

The chipping detecting operation will now be explained.

The illuminating light from the light source 4 for illumination with the illumination angle NA restricted by the aperture stop 42 and the illumination range restricted by the slit 43 disposed at the position of field stop illuminates the rail surface 2 in the form of a slit indicated by the reference numeral 43 through the half-silvered mirror 41 and the object lens 3, as shown in FIG. 30.

The image formed on the rail surface 2 is then formed on the linear image sensor 51 through the object lens 3, the half-silvered mirror 41 and the relay lens 45.

The slit 43 and the image sensor 51 are disposed in such a manner as to be in agreement in the longitudinal direction of the rail surface 2.

The slider 1 is mounted on an XYZ stage 47, which is fed at a constant speed in the direction orthogonal to the longitudinal direction of the rail surface 2, namely, in the parallel direction of the rail surfaces 2 so as to detect a two-dimensional image by the self scanning of the linear image sensor 51.

In the case in which the entire part of the rail surface 2 cannot be detected by one inspection, the rail surface 2 is longitudinally divided into several field views before inspection.

After the detection of the rail surface 2 by means of the linear image sensor 51, the detection signal is converted to a digital signal by the A/D converter 52 and stored in the multi-valued memory 53.

The contents stored in the multi-valued memory 53 are read out by the threshold value calculator 54 so as to obtain a density histogram.

The density histogram has a peak of the bright portion on the rail surface 2 and a peak of the dark portion at the other portions. The trough between the two peaks is obtained as the threshold value.

On the basis of the thus-obtained threshold value, the output of the A/D converter is binarized by the binarization circuit 6, and the result is stored in the image memory (binary memory) 7.

Thereafter, as shown in FIG. 6, the contents stored in the binary memory 7 are read out by the boundary tracing circuit (contour extraction circuit) 8 to obtain the matrix of contour coordinates.

Since the contour is intrinsically composed of straight lines, a concave portion on the contour is detected as a defect.

Although the illumination angle (NA) of illuminating light from the light source 4 for illumination is restricted by using the aperture stop 42 and the slit 43 in this embodiment, the present invention is not restricted to this method. For example, it is possible to use a laser beam as a light source and to scan the illumination range restricted by a slit while using a polarizing means such as a galvanomirror and a polygon mirror disposed at the position of the aperture stop.

In this case, since the laser beam is approximate to parallel rays, it is possible to restrict the illumination angle without using the aperture stop.

Since a high luminance is easily obtained from the laser beam, the laser beam is applicable to high-speed inspection.

As described above, according to the present invention, it is possible to detect the contour of the rail surface accurately without being influenced by chamfering, thereby enabling highly reliable chipping detection without false detection or missing due to the influence of chamfering.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A chipping defect detection system for detecting a chipping defect produced at a boundary portion of an object, said object being formed of a regular shape having a boundary portion including a straight-line portion which is approximated by a straight line, comprising:

image pickup means for sensing an image of the object and for providing an electrical image signal representing said image;

image memory means for storing said electrical image signal as a two-dimensional image detected by said image pickup means;

boundary coordinate detecting means for detecting boundary coordinates of said image; including boundary direction detecting means for successively detecting boundary directions along boundary points of said boundary portion by pattern-matching between an image portion of said two-dimensional image and a plurality of dictionary patterns which show tracing directions of individual boundary points of a reference pattern; said tracing directions indicating tracing direction changes of said reference pattern boundary points; said dictionary patterns being generated by a pattern generator; by successively tracing boundary directions detected by said boundary direction detecting means and storing detected boundary coordinates as a matrix in a boundary coordinate table;

means for setting a constant boundary length equal to 2k of a chipping defect to be detected, said boundary length being defined in part by end points A and C, for detecting a chipping defect on said straight line or in a corner of said object through a single operation;

means for reading out 2k+1 boundary coordinates from said boundary coordinate table; for variably selecting a variable intermediate point B; and for calculating one of a deviation $D_{l_1, l_2}$ of said point B from a straight line between points A and C, and a crossing angle $\Theta_{l_1, l_2}$ for a straight line between points A and B and a straight line between points B and C, for each triangle of a total of (2k−1) triangles formed from possible points A, C and B, wherein $l_1$ is the distance from A to B, $l_2$ is the distance from C to B, and $l_1$ and $l_2$ are positive integers satisfying the relation $l_1 + l_2 = 2k$, point B being selected to vary $l_1$ and $l_2$;

first means for calculating a minimum value $D_p$ of said deviation $D_{l_1, l_2}$ when said reading-out means calculates the deviation $D_{l_1, l_2}$, and for calculating a value $\Theta_p$ of said crossing angle $\Theta_{l_1, l_2}$ when said reading-out means calculates the crossing angle $\Theta_{l_1, l_2}$ for said $2k-1$ triangles;

second means for calculating a center point deviation $D_k$ when said reading-out means calculates the deviation $D_{l_1, l_2}$ and for calculating a center point angle $\Theta_k$ when said reading-out means calculates the crossing angle $\Theta_{l_1, l_2}$, for a point B satisfying the relation $l_1 = l_2 = k$;

means for repeating the calculations performed by said first and second calculating means by reading out boundary coordinates from said boundary coordinate table;

means for detecting a chipping defect size by obtaining differences of values calculated by said first and second calculating means from corresponding values of a reference object; and judgment means for judging presence or absence of a chipping defect on the basis of the chipping defect size detected by said chipping defect size detecting means.

2. A defect detection system as claimed in claim 1, wherein said tracing direction is determined by selecting one of exclusive logical sums in accordance with a predetermined priority order.

3. A defect detection system as claimed in claim 1, wherein geometrical configurations of each triangle are stored in ROM.

4. A defect detection system as claimed in claim 1, wherein said judging means establishes a threshold boundary size above which a detected boundary tracing is judged to be a true defect.

5. A defect detection system for detecting a defect of an object of detection, comprising:

means for imagewise sensing an object having a plurality of images and producing an electrical image signal of said object;

image pickup means for sensing the images of the object and for providing an electrical image signal representing each said image;

image memory means for storing said plurality of electrical image signals detected by said image pickup means as a two-dimensional image;

boundary coordinate detecting means for detecting boundary coordinates of said image; including boundary direction detecting means for successively detecting boundary directions along boundary points of said boundary portion by pattern-matching between an image portion of said two-dimensional image and a plurality of dictionary patterns which show tracing directions of individual boundary points of a reference pattern; said tracing directions indicating tracing direction changes of said reference pattern boundary points; said dictionary patterns being generated by a pattern generator; by successively tracing boundary directions detected by said boundary direction detecting means and storing detected boundary coordinates as a matrix in a boundary coordinate table;

means for setting a constant boundary length equal to $2k$ of a chipping defect to be detected, said boundary length being defined in part by end points A and C, for detecting a chipping defect on said straight line or on a corner of said object through a single operation;

means for reading out $2k+1$ boundary coordinates from said boundary coordinate table; for variably selecting a variable intermediate point B; and for calculating one of a deviation $D_{l_1, l_2}$ of said point B from a straight line between points A and C, and a crossing angle $l_1, l_2$ for a straight line between points A and B and a straight line between points B and C, for each triangle of a total of $(2k-1)$ triangles formed from possible points A, C and B, wherein $l_1$ is the distance from A to B, $l_2$ is the distance from C to B, and $l_1$ and $l_2$ are positive integers satisfying the relation $l_1 + l_2 = 2k$, point B being selected to vary $l_1$ and $l_2$;

first means for calculating a minimum value $D_p$ of said deviation $D_{l_1, l_2}$ when said reading-out means calculates the deviation $D_{l_1, l_2'}$ and for calculating a value p of said crossing angle $l_1, l_2$ when said reading-out means calculates the crossing angle $l_1, l_2$ for said $2k-1$ triangles;

second means for calculating a center point deviation $D_k$ when said reading-out means calculates the deviation $D_{l_1, l_2'}$ and for calculating a center point angle $_k$ when said reading-out means calculates the crossing angle $l_1, l_2'$ for a point B satisfying the relation $l_1 = l_2 = k$;

means for repeating, for each of said images, the calculations performed by said first and second calculating means by reading out boundary coordinates from said boundary coordinate table;

means for detecting a chipping defect size by obtaining differences of values calculated by said first and second calculating means from corresponding values of another image; and judgment means for judging presence or absence of a chipping defect on the basis of the chipping defect size detected by said chipping defect size detecting means.

6. A defect detection system as claimed in claim 5, wherein said chipping size is obtained from the curvature of the trace connecting the two end points A and C of detection and the intermediate point B.

7. A defect detection system as claimed in claim 5, wherein said chipping size is obtained from the height of a triangle whose three vertices are respectively represented by the two end points A and C of detection and the intermediate point B.

8. A defect detection system as claimed in claim 5, wherein said boundary coordinate detecting means each image determined the direction of boundary tracing from a logical sum output obtained by calculating an exclusive logical sum of each of several predetermined pairs of reference $3 \times 3$ patterns and imaged $3 \times 3$ patterns of each said image, and adding together as exclusive logical sums.

9. A defect detection system as claimed in claim 6, further comprising a means for obtaining an interval between respective corners of one of said images embodied in the stored two-dimensional image from the detected curvature.

10. A defect detection system as claimed in claim 7, further comprising means for obtaining an interval between respective corners of one of said images embodied in said two-dimensional stored image from a detected height of the triangle.

11. A defect detection system as claimed in claim 6, wherein said means for judging presence or absence of a chipping defect does so by comparing the detected curvature with a reference curvature.

12. A defect detection system as claimed in claim 7, wherein said means for judging presence or absence of a defect does so by comparing a detected height of a triangle with a reference triangle height.

13. A defect detecting system as claimed in claim 9, wherein said means for judging presence or absence of a defect does so by comparing a detected curvature with a predetermined curvature.

14. A defect detection system as claimed in claim 10, wherein said means for judging presence or absence of a defect does so by comparing a detected height of a triangle with a predetermined triangle height.

15. A defect detection system as claimed in claim 5, wherein said boundary includes at least a portion represented by a straight-line approximation.

16. A defect detection system for detecting a defect of an object of detection, comprising:

illuminating means for illuminating an object of detection in a bright field;

image detecting means for imaging the object of detection and photoelectrically converting the detected image into an electrical image signal;

image memory means for storing said electrical image signal as a two-dimensional image detected by said image detecting means;

boundary coordinate detecting means for detecting boundary coordinates of said two-dimensional image; including boundary direction detecting means for successively detecting boundary directions along boundary points of said boundary portion by pattern-matching between an image portion of said two-dimensional image and a plurality of dictionary patterns which show tracing directions of individual boundary points of a reference pattern; said tracing directions indicating tracing direction changes of said reference pattern boundary points; said dictionary patterns being generated by a pattern generator; by successively tracing boundary directions detected by said boundary direction detecting means and storing detected boundary coordinates as a matrix in a boundary coordinate table;

mean for setting a constant boundary length equal to $2k$ of a chipping defect to be detected, said boundary length being defined in part by end points A and C, for detecting a chipping defect on said straight line or on a corner of said object through a single operation;

means for reading out $2k+1$ boundary coordinates from said boundary coordinate table; for variably selecting a variable intermediate point B; and for calculating one of a deviation $D_{l_1, l_2}$ of said point B from a straight line between points A and C, and a crossing angle $_{l_1, l_2}$ for a straight line between points A and B and a straight line between points B and C, for each triangle of a total of $(2k-1)$ triangles formed from possible points A, C and B, wherein $l_1$ is the distance from A to B, $l_2$ is the distance from C to B, and $l_1$ and $l_2$ are positive integers satisfying the relation $l_1+l_2=2k$, point B being selected to vary $l_1$ and $l_2$;

first means for calculating a minimum value $D_p$ of said deviation $D_{l_1, l_2}$ when said reading-out means calculates the deviation $D_{l_1,l_2'}$ and for calculating a value $_p$ of said crossing angle $_{l_1,l_2}$ when said reading-out means calculates the crossing angle $_{l_1, l_2}$ for said $(2k-1)$ triangles;

second means for calculating a center point deviation $D_k$ when said reading-out means calculates the deviation $D_{l_1, l_2'}$ and for calculating a center point angle $_k$ when said reading-out means calculates the crossing angle $_{l_1, l_2}$, for a point B satisfying the relation $l_1=l_2=k$;

means for repeating the calculations performed by said first and second calculating means by reading out boundary coordinates from said boundary coordinate table;

means for detecting a chipping defect size by obtaining differences of values calculated by said first and second calculating means from corresponding values of a reference object; and judgment means for judging presence or absence of a chipping defect on the basis of the chipping defect size detected by said chipping defect size detecting means.

17. A defect detection system as claimed in claim 16, wherein said illuminating means includes means for reflecting illuminating energy from the object of detection towards said image detecting means, and said defect detection system further comprises:

illumination angle controlling means for controlling the illumination angle of the illuminating energy so that the reflected image of the object of detection is within a maximum reflection angle capable of providing full detection capability of said image detecting means when said illuminating means illuminates an inclined detection surface of said object; and illumination range restricting means for restricting the illumination range to the range of detectable pixels of the image detecting means.

18. A defect detection system as claimed in claim 16, wherein said boundary includes at least a portion represented by a straight-line approximation.

* * * * *